(12) United States Patent
Pettersson

(10) Patent No.: US 6,840,898 B2
(45) Date of Patent: Jan. 11, 2005

(54) APPARATUS FOR THE POSITIONING OF A TOOL OR A TOOL HOLDER IN A MACHINE DESIGNED FOR PROCESSING A SHEET MATERIAL

(75) Inventor: Niklas Pettersson, Enköping (SE)

(73) Assignee: Emsize AB, Enkoping (SE)

( * ) Notice: Subject to any disclaimer, the term of this patent is extended or adjusted under 35 U.S.C. 154(b) by 0 days.

(21) Appl. No.: 10/684,426

(22) Filed: Oct. 15, 2003

(65) Prior Publication Data

US 2004/0082453 A1 Apr. 29, 2004

Related U.S. Application Data

(62) Division of application No. 09/807,024, filed as application No. PCT/SE99/01781 on Oct. 8, 1999, now abandoned.

(30) Foreign Application Priority Data

Oct. 9, 1998 (SE) ................................................ 9803459

(51) Int. Cl.[7] .................................................. B31B 1/28
(52) U.S. Cl. .......................... 493/473; 493/65; 493/475; 74/37
(58) Field of Search ................................. 493/473, 468, 493/475, 476, 65; 74/37

(56) References Cited

U.S. PATENT DOCUMENTS

| | | |
|---|---|---|
| 3,886,833 A | 6/1975 | Gunn et al. |
| 4,252,233 A | 2/1981 | Joice |
| 4,342,562 A | 8/1982 | Fröidh et al. |
| 4,994,008 A | 2/1991 | Haake et al. |
| 5,259,255 A | 11/1993 | Urban et al. |
| 5,397,423 A | 3/1995 | Bantz et al. |
| 5,667,468 A | 9/1997 | Bandura |
| 5,964,686 A | 10/1999 | Bidlack et al. |
| 6,245,004 B1 | 6/2001 | Waters |

FOREIGN PATENT DOCUMENTS

| | | |
|---|---|---|
| FR | 2 280 484 | 2/1976 |
| FR | 2 626 642 | 8/1989 |

*Primary Examiner*—Eugene Kim
*Assistant Examiner*—Christopher Harmon
(74) *Attorney, Agent, or Firm*—Young & Thompson

(57) ABSTRACT

Arrangement for the positioning and shifting of tools, specifically the tools of a machine designed for shaping sheet material while being advanced relative to the arrangement, the arrangement having fixed guides (16,19) for guiding the tools in transverse motion relative to the travel direction (X) of the material, the tools or holders (7,7') for the tools comprising means (22,23) by which a continuous or intermittently running drive (Y) across the material travel direction (X) is used for shifting the tool holders, individually or in combination, by alternately connecting one or several tool holders (7,7') to the running drive.

12 Claims, 3 Drawing Sheets

APPARATUS FOR THE POSITIONING OF A TOOL OR A TOOL HOLDER IN A MACHINE DESIGNED FOR PROCESSING A SHEET MATERIAL

This application is a division of application Ser. No. 09/807,024, filed on Apr. 9, 2001 (now abandoned). Application Ser. No. 09/807,024 is the national phase of PCT International Application No. PCT/SE99/01781 filed on Oct. 8, 1999 under 35 U.S.C. § 371. The entire contents of each of the above-identified applications are hereby incorporated by reference.

TECHNICAL FIELD

This invention relates to apparatuses and arrangements for the controlled positioning of tools or holder for tools, preferably in a machine for shaping or processing sheet material. More specifically, the invention relates to an apparatus having means for the controlled and accurate positioning of holders for tools, the tools being designed for engagement with the material in the feed direction or feed directions relative to a process machine. The invention also relates to process machines having a control and positioning apparatus in accordance with the invention, and specifically a machine for shaping and processing a planar packing material such as corrugated board, card board and similar material into a blank for wrappings, or other articles.

In the disclosure, there is suggested a structurally plain and cost effective arrangement for positioning tools operative for cutting, milling, perforation, folding or similar processing, as well as for position sensing and detection. The positioning apparatus may be formed for shifting the tools to operative engagement with the material at least in a direction that coincides with the material feed direction relative to the apparatus. In one embodiment for the packing industry there is suggested an apparatus designed for the controlled positioning of tools in operative engagement in a direction transversally to the material feed direction relative to the apparatus. The positioning apparatus of the invention may also be operated as the tools are in operative engagement with the material, for processing the material in any desired direction or angular relative to the general feed direction, and thus also in curved engagement at different radius.

The invention may be applied for processing different materials. The invention is disclosed herein as an embodiment designed for process operations such as cutting, folding, punching, etc., of sheet materials like corrugated board or card board. From the disclosure, however, the man of skill in the art will understand how to dimension and adapt the inventive arrangements with tools which are suitable for processing wood, fiber board, metal plate, plastics, etc. Alternative processes may include water milling, laser milling, drilling, slot cutting or other appropriate process operation and engagement. Accordingly, the thickness of the processed material is not a limitation to the invention.

In the invention there is suggested a positioning arrangement by which tools are controlled and shifted to alternate positions and in alternate directions of operative engagement. A characterizing feature of the invention is that a set of tools, the number of which may be chosen from the subject technical requirements and desired process aims, are coincidentally but individually controlled to be positioned through the operation of one single positioning means. In the set of tools, the individual tool may alternatively be controlled for coordinated and simultaneous shift movement or engaging process movement, or alternatively be controlled for individual movement relative to the material and relative to the other tools. This way, the invention makes possible a shifting of tools concurrently with an operative process engagement in accordance with a preset work scheme, by utilizing a driven motion in a single positioning arrangement.

The positioning arrangement of the invention is driven in a continuous or intermittent motion that is transferred to the tools, or holder for the tools, for individually shifting the tool position or for operative engagement with the material. The tool or tool holder comprises means, controlled by the work scheme for gripping or connecting to the driven motion of the positioning arrangement, such that the tools are carried along in the driven motion.

The driven motion of the positioning arrangement may be performed in alternative ways. The disclosed packing industry embodiment suggests a toothed belt, running on cog wheels, to which the tool holders are controlled for alternative engagement with the upper or lower part of the belt to be carried along in either of two directions. Instead of the toothed belt, other flexible and endless elements such as V-belts, chains or lines which are driven to run on wheels or rollers may alternatively be utilized.

The positioning arrangement may be continuously or intermittently driven in a motion substantially transverse to the material feed direction during the work process. A single drive means is required to provide the continuous or intermittent transverse motion, so that the invention makes possible a structurally plain drive for the tool shifting and/or processing motion, through the separately controlled connection with the positioning arrangement. Through appropriately dimensioned gears, transmission and couplings, the drive means may also be used for providing the material feed motion relative to the arrangement.

In the disclosure, there is shown an embodiment designed for processing a sheet formed packing material. The process machine is stationary, while the material is fed in relative movement to the machine. Said relative movement has a main feed direction transversely to the machine, and substantially transverse to the two movement directions of the positioning arrangement. The feed motion may be a reciprocating motion in the main feed direction. In a further implementation of the invention, the material may be stationary. In this case, the positioning arrangement is supported on a structural element, which is movable relative to the material. Said structural element may be movable relative to the process machine, and the latter may itself be movable relative to the processed material.

Within the technical field from where the invention has originated, there is a problem in that machines for producing packing blanks of different shapes and dimensions often are structurally complicated and space consuming. Accordingly, they tend to be expensive both in aspects of construction, installation, maintenance and operation.

A typical example of a machine for said purpose is disclosed in EP 0 247 300. This machine has several stations, some of them including tools for folding and cutting both lengthwise and transversely. This machine produces packing blanks from a web of corrugated card board, supplied from a supply reel. The machine has a large number of moving parts, such as axles and rollers for feeding the web, chains, drive motors, etc. All parts are supported in a space consuming frame that requires a correspondingly spacious accommodation.

In said machine, the stations for folding and cutting comprise positioning means for shifting the tools position in adaptation to desired dimensions of the packing blank. A common drawback of said positioning means is that shifting of the tools may only be accomplished in symmetry with the longitudinal center of the machine.

In the subject invention there is provided a solution to above said problem. The inventive positioning arrangement makes possible a controlled shifting of a desired number of individual tools, either separately or in mutual synchronization, for positioning the tools or for operative engagement with the material. In a single process station, multiple work operations may thus be concurrently or sequentially performed in multiple tool shifting movements, individually or in coordination. The movements may be concurrently executed in alternate directions by separately connecting individual tools to a single transverse motion, whereby the space required for the machine is significantly reduced. Also, as a result from the shorter total length of the machine made possible by the invention, the process time for preparing a packing blank may be significantly reduced. A significant simplicity of construction and maintenance is achieved when the shifting of each tool, and possibly also the tool's controlled movement under engagement with the material, is accomplished by a single transverse motion, or a motion transversally to the moving or feeding direction of the material.

This way, good process economy is obtainable also on a smaller production scale, and more specifically also in single unit production. The versatility of a machine comprising the inventive positioning arrangement may advantageously be exploited by the end user, i.e. for product-guided processing of packing blanks in the packing line of a producer company. Hereby, the producer gains storage space and access to individually designed packing blanks, and need not tie-up capital for storing packing blanks.

OBJECT OF INVENTION

One object of the invention is to provide an arrangement having means for accurate and versatile, controlled positioning of tools or tool holders in a machine adapted for processing a sheet material. Processes of cutting, slot milling, folding, perforating, etc., may be performed with accuracy in various lateral positions and in accordance with a preset work scheme when the material is forwarded relative to the arrangement.

Another object of the invention is to provide a machine, incorporating the inventive positioning arrangement for processing packing material.

These objects are met in arrangements and machines formed in accordance with claim 1. Preferred embodiments of the invention are defined in the subclaims.

DRAWINGS

The invention is further disclosed with reference to the attached drawings. In the drawings FIG. 1 shows the operative elements of the invention incorporated in a machine for processing a sheet material, in a perspective view from the feeding end;

DETAILED DESCRIPTION

The following detailed description of the invention refers to an application for the packing industry. However, the positioning arrangement of the invention may also be utilized within other technical fields for processing and finishing various sheet materials, by installing the adequate tools.

Figure 3:
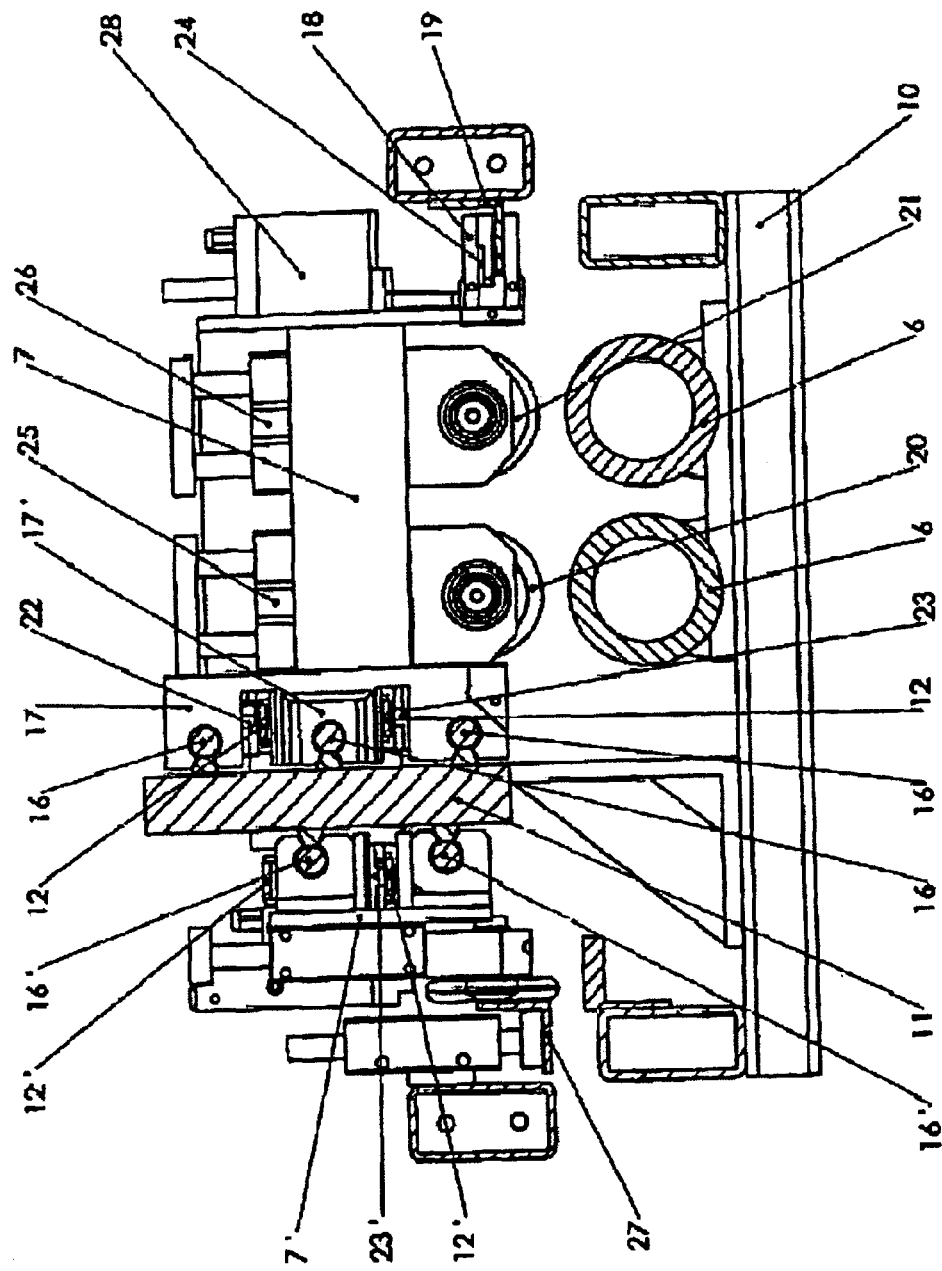
FIG. 3 is a sectional view, showing the inventive arrangement of FIGS. 1 and 2.

With reference to FIG. 3, there is disclosed a machine 1 for processing corrugated board, card board or similar sheet material in order to produce packing blanks or other articles. In the disclosed application, the arrangement carries tools for cutting and folding in order to produce slots and folding marks in the work piece. Naturally, in applications for processing synthetic material, wood or metal plate, etc., the tools would be chosen in consideration of the properties of the subject material, and consequently the tools may comprise various kinds of cutting edges.

Figure 1:
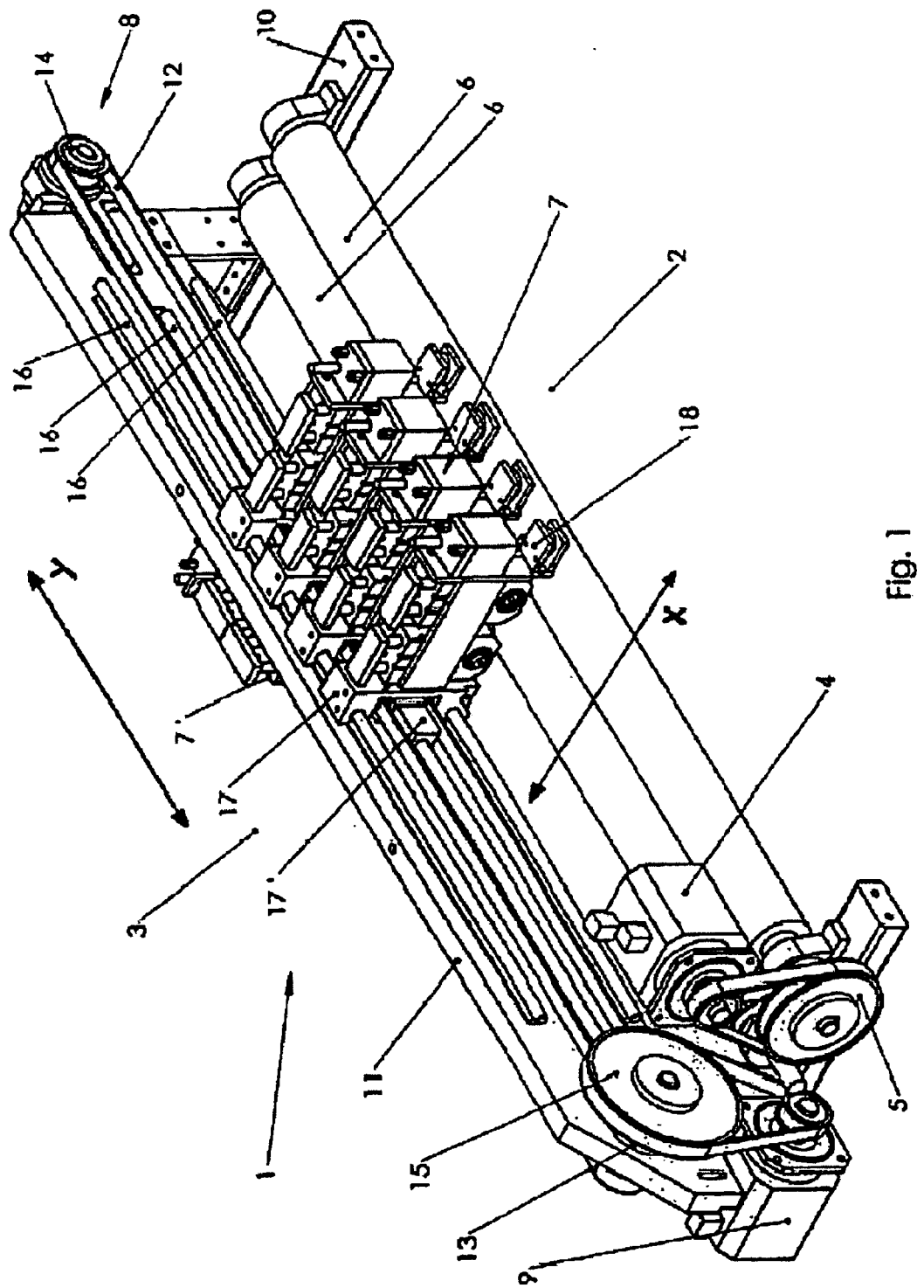

The machine 1 comprises means for feeding the material relative to the machine. The material is moved in a forward main direction X, alternatively in a reciprocating motion, to be fed through the machine X in a process cycle from a feeding end 2 to a discharge end 3 (see FIGS. 1 and 2, respectively). The feed means may comprise a reversible motor 4, which rotates a pair of rolls or rollers 6 via a transmission 5.

A number of tool holders 7 are supported to be laterally movable above the feed rollers 6. The tool holders 7 carries tools which are operative for processing the material in the main direction X, whereby the feed rollers 6 also may serve as counter rollers for the tools. For this purpose, the rollers 6 have a surface coating which is adapted to cooperate with the tool. The tool holders are shifted laterally by a driven positioning means 8. Said positioning means is designed to carry individual tool holders 7 to a predetermined lateral position relative to the material and relative to other tool holders 7. The positioning means 8 is driven by a motor 9. All elements in the inventive positioning arrangement are supported by a frame 10, which is only partially shown in the drawings.

Said positioning means 8, the motor 9 and tool holders 7 are supported in the frame 10, in the shown embodiment on a beam 11 which reaches transversely to the material's travel direction in the machine 1.

The positioning means 8 comprises an endless line 12, driven by the motor 9. The line 12 runs over a drive wheel 13 and a running wheel 14 and reaches across the arrangement at a length which admits the tool holders to be positioned and to operate over the working width of the machine. A gear reduction 15 may be necessary for reducing the motor speed to a suitable rotational speed of the endless driven line 12. As will be seen from the drawings of FIGS. 1 and 2, driven lines 12 and 12' may be supported at opposite sides of the beam 11, arranged to serve tool holders 7 and 7' positioned at the feeding and discharge ends, respectively.

The tool holders 7 are supported to be laterally displaceable transversely to the main feed direction X of the material. For this purpose, guide means 16 are arranged on the side of the beam 11. In the shown embodiment, the guides 16 are shaped as rails having a circular section. However, the guides may also be of other shapes, and may e.g. be grooves, formed on the beam 11 or corresponding element. The number and shapes of the guides 16 will be adapted to the specific application and load, and may thus be one or several, and are shown in the described embodiment to be two and three, respectively.

The tool holders 7 comprise slide means 17 by which the tool holders are slidably supported on the guides 16. An aperture, corresponding to the sectional profile of the guides 16 is formed through each slide means 17. A friction reducing slide- or roll bearing means is preferably mounted in the aperture. In the shown embodiment, said slide means 17 are designed for preventing relative motion between the guide means and the tool holder in radial directions. For this purpose, the slide means 17 at least partially encloses the guide 16. Alternatively, the guide 16 is mounted to be circumferentially accommodated in the slide means 17. In the shown embodiment, though, the guides 16 are mounted on a longitudinal bar, having a trapetzoidal section and arranged to support the guides in spaced relation to the surface of beam 11. In order to increase lateral rigidity of the tool holders and to prevent a jam lock, one of the slide means 17' is preferably laterally displaced. In this case, a recess (not shown) is matingly formed on the opposite side of the tool holder for receiving the laterally displaced slide means 17' of an adjacent tool holder in a close position.

In the opposite end of the tool holder 7, a stopper means 18 is arranged to engage a guide means 19 for arresting the tool holder in a set position. Alternatively, the stopper 18 is formed to slidably engage the guide 19 in order to stabilize the lateral movement of the tool holder under displacement or in operative engagement with the material.

One or several tools are supported by the tool holders 7 to be operative in the main feed direction X. In the shown embodiment, said tools are a fold wheel 20 and a cut wheel 21, respectively, arranged in tandem in the main feed direction X. In other applications, the tool holders may comprise tools for cutting, sawing, milling, pressing, punching, riveting, nibbling, etc. The tools may also be displaced in a direction Y. The tools 20,21 are arranged in the tool holders to be vertically adjustable, and in a lowered position to operatively engage the processed material or in raised position to be rested above the surface of the material.

Preferably, the tool holders 7 and tools 20,21 are pneumatically or hydraulically controlled by using air or liquid, supplied through valves and circuits only diagramatically illustrated at 28, or electrically controlled by electric magnets and switches (not shown).

Reference being made to FIG. 3, wherein clamp means such as plungers 22,23 are shown to be pneumatically or hydraulically operated for engagement with the upper or lower part of the endless driven line 12, as appropriate. When activated, the clamp means 22,23 presses the line 12 to be clamped by a counter support formed in the tool holder such that the tool holder is carried along by the moving line. the clamp means 22,23 are individually activated and controlled by a preset work scheme, such that each tool holder 7 may be individually controlled for operative or positioning displacement transversally to the material main feed direction X, separate from or in coordination with the displacement of the other tool holders. An accurate synchronization and positioning of tool holders 7 relative to a start position is achievable by the inventive arrangement, when the drive means 9 is an electric motor which is frequency controlled, or a hydraulic motor.

In the shown embodiment the driven line 12 is a toothed belt, and the wheels 13,14 are cog wheels. The driven line may be of other construction, and may thus be an endless chain, V-belt, or a line having a circular section, as long as a skid free transfer of the motor power is secured.

A pneumatically or hydraulically operated clamp means, such as a plunger 24 provides a stopping engagement with the guide 19 for arresting the tool holder in the set position.

The clamp means 22,23 and 24 may alternatively be electrically operated, and may e.g. be solenoids.

The tools 20,21 are vertically adjustable relative to the processed material. To this purpose, the tools are supported in the lower ends of two double-acting pistons 25 and 26, which are disposed in parallel to be activated by air, liquid or electricity.

The clamp means 22,23 for guiding and positioning the tool holders, as well as the clamp means 24 and the pistons 25,26 for lowering or rising the tools, are controlled in their operation through a preset work scheme for processing and finishing the work material. Preferably, the work scheme is stored in a digital memory unit and executed in a processor. The signal output from the processor controls appropriate valves, pressure regulators and the motors 4 and 9 to perform the process steps and tool displacements stored in the memory unit, in an automatic work cycle which is substantially free from any interruptions. It will be understood, that the tools are raised above the surface of the material in displacement mode for positioning the tool holders 7, and that the positioning movement is coordinated with the material's feed movement relative to the machine, i.e. in coordination with the operation of motor 4.

The inventive positioning arrangement is shown herein in connection with a machine for processing sheet formed card board or corrugated board which is formed into packing blanks for boxes of varying sizes and construction.

Figure 2:
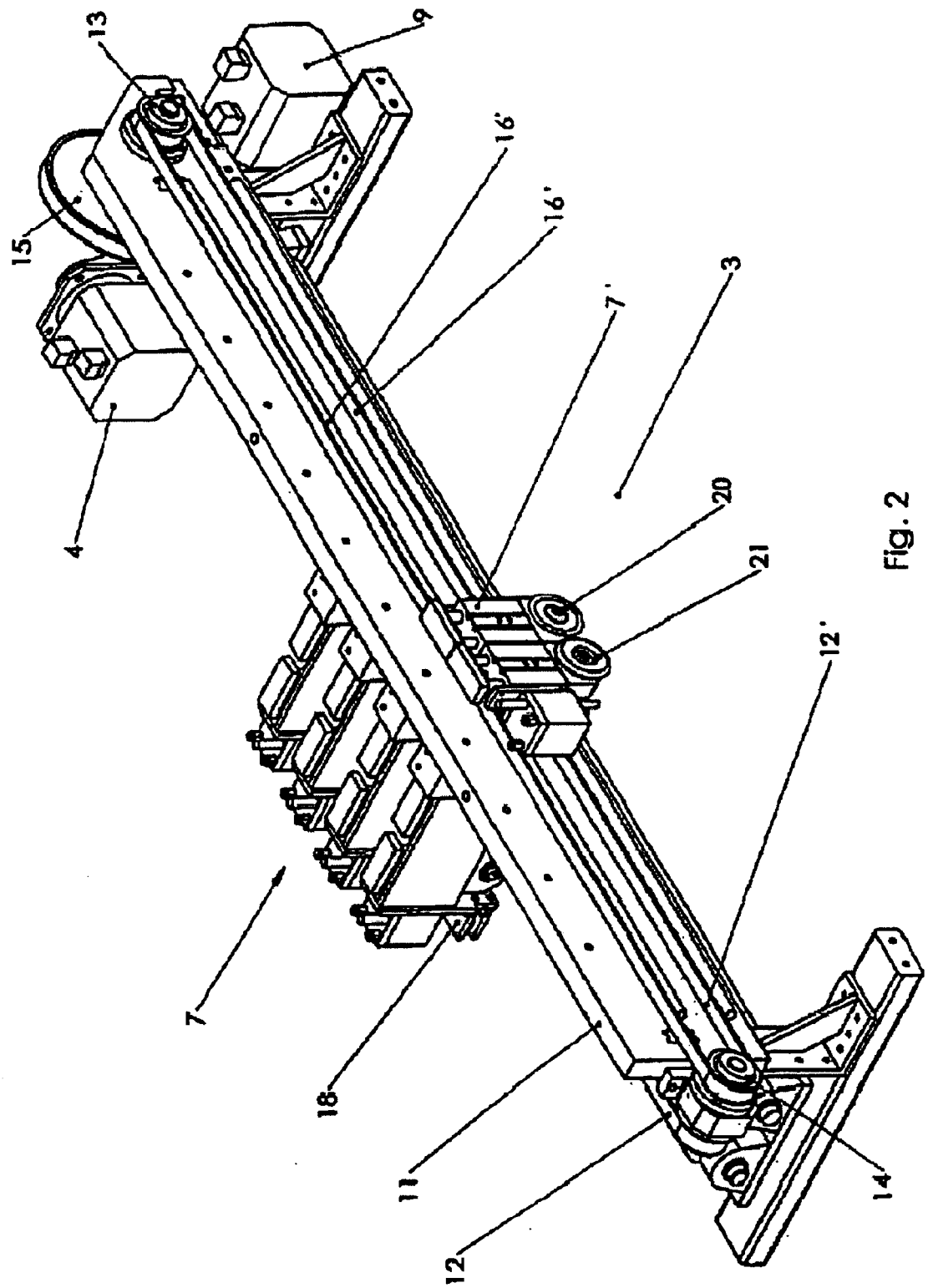
FIG. 2 shows the machine of FIG. 1 from the discharge end.

Reference being made to FIGS. 2 and 3, wherein the discharge end of the machine has a tool holder 7' supported to be laterally displaceable transversally to the main feed direction X, substantially as the tool holders 7 on the feed end of the machine. Vertically adjustable cutting tools and folding tools are mounted in the tool holder 7' for cutting slots or making fold marks in the material, transversally to the motion in the direction X and transversally also to such slots and fold marks which are made by the tools of the tool holders 7. An endless and driven line 12', running on wheels 13,14 carries the tool holder 7' in alternating engagement with the upper and lower part of the line, respectively, for operation in both motion directions. The line 12' is driven synchronously to the line 12 by the common motor 9. The synchronous drive and motion of the lines 12,12' in process operations transversally to the motion in the direction X may selectively be used for coincident positioning or control of one or several tool holders 7,7', either separately or in mutual synchronization in accordance with the preset work scheme. The material feed motion relative to the arrangement may be stalled during process steps operating transversally to the feed direction, in which case a holding means 27 is operable to hold the material in such transverse processes.

In the disclosed application, the machine comprises a number of individually controlled tool holders 7. The outermost tool holders may include detecting means (not shown) for detecting the longitudinal margins of the material. The outer tool holders may further comprise tools, e.g. cutting tools for adjusting the material width to the dimensions of the finished packing blank or article, or e.g. feed rollers (not shown) for holding the processed material in contact with the feed rollers 6. A program for controlling the positioning and process operation may preferably contain information for the positioning of all tool holders to a start position which is adapted to the material's input position in the machine as registered by the detecting means of the outermost tool holders.

In a modified embodiment, the positioning arrangement and the relative motion between the processed material and the machine/tools is generated by a common drive means, and distributed via a transmission which is controlled from the stored work scheme. It will be understood, that with an appropriate choice of tools and control parameters, the material feed and tool control may be synchronized for angular processing of the material under feed, e.g. in order to perform diagonal fold lines and slitting, or for curve cutting. This modified embodiment may be preferred in connection with laser cutting or water milling.

The machine of the disclosed application example comprises tools for highly automated processing in two, mutual transverse directions. The control program thus contains information for cutting and folding the material in the longitudinal and transverse directions, respectively. While avoiding manual adjustment, packing blanks or other articles of varying dimensions may thus selectively be produced from a single basic material, e.g. a so called fanfold or a roller supply.

The technician in the field of packing industry may further modify the machine for other production, e.g. the production of storage articles such as cassettes having drawers for storage, exhibition material and display material, etc.

The main feature of the invention is here illustrated in connection with an embodiment, wherein a continuous or intermittent motion in a direction Y, transversally to the main feed direction X of a transported material, is utilized by individual tool holders for separate or synchronous lateral displacement by being selectively connectable to the transverse motion. Said transverse motion is performed by an endless line, which is driven to run on wheels. Another feature of the invention is, that the positioning arrangement provides controlled positioning of one or more individual tool holders transversely to the material's main feed direction, separately or in mutual synchronization, concurrently with the controlled positioning of one or more individual tool holders in the opposite direction, separately or in mutual synchronization, wherein a single motion generating means is continuously or intermittently driven to be selectively engaged by individual tool holders.

The invention has been illustrated in connection with a machine for processing a sheet material to packing blanks. However, it will be understood that the positioning arrangement of the invention may be modified for other implementations where multiple process steps are performed in the surface of a material having more thickness, or performed through a sheet material of lesser thickness. From the disclosure, it will also be understood that the operation of the inventive positioning arrangement is independent form the properties of the material to be processed when choosing the appropriate tools to be mounted in the tool holders. Further it will be understood, that the relative motion between material and tools may be achieved through driven motion of the material relative to a stationary machine, or alternatively through driven motion of the machine relative to a stationary material.

What is claimed is:

1. A machine for processing a sheet material into packing blanks, comprising:

a set of feed rollers, the feed rollers driven for feeding the sheet material in a first, longitudinal direction;

a first set of tool holders carrying tools for processing the sheet material in said longitudinal direction;

the first set of tool holders being supported on guide means above the feed rollers and laterally movable in a second direction, transversely to said first direction, said first set of tool holders having clamping means controllable for connecting and disconnecting each tool holder of the first set, separately and selectively, to endless belt driven for rotation for positioning of the tool holders of said first set in the transverse direction; and a second set of tool holders carrying tools for processing the sheet material in the second, transverse direction, the second set of tool holders being supported on guide means and movable in said transverse direction, said second set of tool holders having clamping means controllable for connecting and disconnecting each tool holder of the second set to an endless belt driven driven for rotation for positioning of the tool holders of the second set in the transverse direction, wherein, at least one tool holder of said first set and at least one tool holder of said second set of tool holders are each carrying a cutting tool and a creasing tool respectively, said cutting tools and creasing tools being selectively controllable for conducting cutting or creasing operations in the longitudinal and transverse directions, and the feed rollers serve as counter-support for the tools in both cutting and creasing operations, respectively.

2. The machine of claim 1, wherein the endless belt is intermittently driven for laterally positioning the tools of said first set of tool holders.

3. The machine of claim 1, wherein the first set of tool holders is associated with a first endless belt, the second set of tool holders is associated with a second endless belt, and a singular motor driving the two belts.

4. The machine of claim 1, wherein the feed rollers are driven for reciprocally feeding the sheet material in the first direction.

5. The machine of claim 1, wherein the cutting tool is a cutting wheel and the creasing tool is a creasing wheel.

6. A machine for processing a sheet material into packing blanks, comprising:

a set of feed rollers, the feed rollers driven for feeding the sheet material in a first, longitudinal direction;

a first set of tool holders carrying tools for processing the sheet material in said longitudinal direction;

said first set of tool holders being supported on guide means above the feed rollers and laterally movable in a second direction, transversely to said first direction;

said first set of tool holders having clamping means controllable for connecting and disconnecting each tool holder of said first set, separately and selectively, to an endless belt intermittently driven for rotation for positioning of the tool holders of said first set in the transverse direction;

a second set of tool holders carrying tools for processing the sheet material in the second, transverse direction;

said second set of tool holders being supported on guide means and movable in said transverse direction;

said second set of tool holders having clamping means controllable for connecting and disconnecting each tool holder of said second set to an endless belt intermittently driven for rotation for positioning of the tool holders of said second set in the transverse direction, wherein, at least one tool holder of said first set and at least one tool holder of said second set of tool holders are each carrying a cutting tool and a creasing tool, respectively, said cutting tools and creasing tools being selectively controllable for conducting cutting or creasing operations in both said longitudinal and transverse directions, and said feed rollers serve as counter-support for the tools in both cutting and creasing operations, respectively.

7. The machine of claim 6, wherein the first set of tool holders is associated with a first endless belt, the second set of tool holders is associated with a second endless belt, and a singular motor driving the two belts.

8. The machine of claim 6, wherein the feed rollers are driven for reciprocally feeding the sheet material in the first direction.

9. The machine of claim 6, wherein the cutting tool is a cutting wheel.

10. The machine of claim 6, wherein the creasing tool is a creasing wheel.

11. The machine of claim 6, wherein the first set of tools are displaceable and positionable separately and independent from the second set of tools.

12. The machine of claim 1, wherein the first set of tools are displaceable and positionable separately and independent from the second set of tools.

* * * * *